United States Patent
Carass et al.

(10) Patent No.: US 10,494,255 B2
(45) Date of Patent: Dec. 3, 2019

(54) WATER GAS SHIFT PROCESS

(71) Applicant: JOHNSON MATTHEY PUBLIC LIMITED COMPANY, London (GB)

(72) Inventors: David Carass, Cleveland (GB); Gabriele Germani, Cleveland (GB); Norman MacLeod, Cleveland (GB)

(73) Assignee: Johnson Matthey Public Limited Company, London, England (GB)

(*) Notice: Subject to any disclaimer, the term of this patent is extended or adjusted under 35 U.S.C. 154(b) by 0 days.

(21) Appl. No.: 15/771,417

(22) PCT Filed: Oct. 14, 2016

(86) PCT No.: PCT/GB2016/053180
§ 371 (c)(1),
(2) Date: Apr. 27, 2018

(87) PCT Pub. No.: WO2017/072479
PCT Pub. Date: May 4, 2017

(65) Prior Publication Data
US 2018/0305205 A1    Oct. 25, 2018

(30) Foreign Application Priority Data
Oct. 29, 2015  (GB) .................................. 1519139.8

(51) Int. Cl.
*C01B 3/16*    (2006.01)
*B01D 53/04*   (2006.01)
*C01B 3/56*    (2006.01)

(52) U.S. Cl.
CPC ............ *C01B 3/16* (2013.01); *B01D 53/0423* (2013.01); *C01B 3/56* (2013.01);
(Continued)

(58) Field of Classification Search
CPC .............................. C01B 3/16; B01D 53/0423
See application file for complete search history.

(56) References Cited

U.S. PATENT DOCUMENTS 3,922,337 A   11/1975   Campbell et al.
4,328,130 A    5/1982   Kyan
(Continued)

FOREIGN PATENT DOCUMENTS

DE   3819436    12/1989
EP   1487578    12/2004
(Continued)

OTHER PUBLICATIONS

PCT/GB2016/053180 International Search Report dated Jan. 25, 2017.
(Continued)

*Primary Examiner* — Paul A Wartalowicz
(74) *Attorney, Agent, or Firm* — BakerHostetler

(57) ABSTRACT

A process is described for increasing the hydrogen content of a synthesis gas mixture comprising hydrogen, carbon oxides and steam, comprising the steps of: (i) passing the synthesis gas mixture at an inlet temperature in the range 300-450° C. over a first water-gas shift catalyst disposed in a first shift vessel to form a first shifted gas mixture, and (ii) passing the first shifted gas mixture at an inlet temperature in the range 170-300° C. over a second water gas shift catalyst disposed in a second shift vessel to form a second shifted gas mixture, wherein the second water-gas shift catalyst comprises copper and the first shift vessel contains a sorbent material for capturing halogen contaminants disposed downstream of the first water gas shift catalyst.

15 Claims, 1 Drawing Sheet

(52) U.S. Cl.
CPC ............ *B01D 2253/104* (2013.01); *B01D 2257/2025* (2013.01); *C01B 2203/0233* (2013.01); *C01B 2203/0288* (2013.01); *C01B 2203/042* (2013.01); *C01B 2203/0415* (2013.01); *C01B 2203/0425* (2013.01); *C01B 2203/0465* (2013.01); *C01B 2203/1047* (2013.01); *C01B 2203/1076* (2013.01)

(56) References Cited

U.S. PATENT DOCUMENTS

| | | | |
|---|---|---|---|
| 4,499,203 A | | 2/1985 | Toulhoat et al. |
| 4,721,611 A | | 1/1988 | Pinto et al. |
| 5,656,566 A | | 8/1997 | Ward |
| 9,751,039 B2 | * | 9/2017 | Gebald ............ B01D 53/0446 |
| 2003/0026747 A1 | * | 2/2003 | Zhu ................ B01J 8/0457 |
| | | | 422/634 |
| 2006/0233687 A1 | | 10/2006 | Hojlund Nielsen |
| 2008/0257147 A1 | * | 10/2008 | Gregory ............ B01D 45/08 |
| | | | 95/46 |
| 2009/0152500 A1 | | 6/2009 | Chen et al. |
| 2011/0166013 A1 | | 7/2011 | Cairns et al. |
| 2012/0202681 A1 | | 8/2012 | Park et al. |
| 2012/0214881 A1 | * | 8/2012 | Wahlstrom ........ B01D 53/1406 |
| | | | 518/703 |
| 2012/0223274 A1 | | 9/2012 | Hinton et al. |
| 2012/0232322 A1 | * | 9/2012 | Wilson ............ B01D 53/52 |
| | | | 585/845 |
| 2014/0115955 A1 | | 5/2014 | McNeff et al. |
| 2016/0074844 A1 | | 3/2016 | Freer et al. |

FOREIGN PATENT DOCUMENTS

| | | | | |
|---|---|---|---|---|
| EP | 2049249 | | 4/2009 | |
| EP | 2141118 A1 | | 1/2010 | |
| EP | 2237882 | | 10/2010 | |
| EP | 2240273 | | 10/2010 | |
| EP | 2323762 | | 5/2011 | |
| EP | 2442904 | | 4/2012 | |
| EP | 2599541 | | 6/2013 | |
| EP | 2924002 | | 9/2015 | |
| GB | 940960 | | 11/1963 | |
| GB | 1087987 | | 10/1967 | |
| GB | 1131631 | | 10/1968 | |
| GB | 1213343 | | 11/1970 | |
| GB | 1323064 | | 7/1973 | |
| GB | 1357335 | | 6/1974 | |
| GB | 2288341 | | 10/1995 | |
| WO | WO 2003/002452 A1 | | 1/2003 | |
| WO | WO 2003/082468 A1 | | 10/2003 | |
| WO | WO 2008/012255 A2 | | 1/2008 | |
| WO | WO 2009/076119 A1 | | 6/2009 | |
| WO | WO 2009/078979 A2 | | 6/2009 | |
| WO | WO 2010/028324 A2 | | 3/2010 | |
| WO | WO 2010/029323 A1 | | 3/2010 | |
| WO | WO 2010/029324 A1 | | 3/2010 | |
| WO | WO 2010/029325 A1 | | 3/2010 | |
| WO | WO 2010/045232 A2 | | 4/2010 | |
| WO | WO 2010/146379 A1 | | 12/2010 | |
| WO | WO 2010/146380 A1 | | 12/2010 | |
| WO | WO 2011/055132 A1 | | 5/2011 | |
| WO | WO 2014/170184 | * | 10/2014 | ............ B01D 53/04 |
| WO | WO 2015/007322 A1 | | 1/2015 | |

OTHER PUBLICATIONS

PCT/GB2016/053180 Written Opinion dated Jan. 25, 2017.
GB1519139.8 Search Report under Section 17(5) dated May 10, 2016.
GB1617424.5 Combined Search and Examination Report under Sections 17 and 18(3) dated Nov. 29, 2016.

* cited by examiner

WATER GAS SHIFT PROCESS

CROSS-REFERENCE TO RELATED APPLICATIONS

This application is the National Stage of International Patent Application No. PCT/GB2016/053180, filed Oct. 14, 2016, which claims priority from Great Britain Patent Application No. 1519139.8, filed Oct. 29, 2015, the disclosures of each of which are incorporated herein by reference in their entireties for any and all purposes.

This invention relates to water-gas shift processes.

The water gas shift process is well established as a means to increase the hydrogen content and/or reduce the carbon monoxide content of synthesis gases produced by steam reforming, partial oxidation and gasification of hydrocarbon and carbonaceous feedstocks. The reaction may be depicted as follows.

$$H_2O + CO \leftrightarrow H_2 + CO_2$$

The reaction is mildly exothermic and a favourable equilibrium is obtained at low temperatures. To achieve acceptable conversion for many uses however, the water-gas shift process is carried out in two or more stages using different catalysts. Thus iron-containing catalysts have found widespread use as so-called high-temperature-shift (HTS) catalysts in conjunction with medium temperature shift (MTS) and low temperature shift (LTS) catalysts, which are typically based on copper, depending on the process requirements. Typically, the HTS catalyst is provided as a fixed bed in a first shift vessel and the MTS or LTS catalysts as fixed beds in a second shift vessel downstream of the first shift vessel. Because of the exothermic nature of the water-gas shift reaction, some cooling is generally applied to the part-shifted gas between the first and second shift vessels.

The useful life of these catalysts is largely determined by poisoning by sulphur and halogen species carried forward in the feed. In particular copper-containing catalysts are susceptible to poisoning by chloride species, such as HCl, present in the feed gas.

The ability of the copper-containing catalyst to withstand the impact of chloride poising can be improved by the addition of appropriate levels of alkali compounds. However, there is a potential for soluble species to be washed out or redistributed within the catalyst bed during upset conditions that lead to condensation.

Attempts have been made to place dedicated, insoluble, guard materials at the inlet of the LTS bed to capture incoming chloride species. For example, U.S. Pat. No. 3,922,337 discloses a process for producing hydrogen comprising contacting carbon monoxide with steam over a solid material which is more basic than zinc oxide and then over a low temperature shift catalyst. The guard material in this case was an alkalised alumina, or preferably a low-temperature shift catalyst bed in two parts, the inlet part of which contains alkali above the limit normally acceptable for low-temperature shift catalysts.

However, these solutions have not proven as effective under modern operating conditions. In particular, as operators seek to run the LTS catalysts at conditions close to the dew point, there is a need for a process that reduces the risk of soluble components being re-deposited in the copper containing catalysts.

Accordingly, the invention provides a process for increasing the hydrogen content of a synthesis gas mixture comprising hydrogen, carbon oxides and steam, comprising the steps of:

(i) passing the synthesis gas mixture at an inlet temperature in the range 300-450° C. over a first water-gas shift catalyst disposed in a first shift vessel to form a first shifted gas mixture, and (ii) passing the first shifted gas mixture at an inlet temperature in the range 170-300° C. over a second water gas shift catalyst disposed in a second shift vessel to form a second shifted gas mixture, wherein the second water-gas shift catalyst comprises copper and the first shift vessel contains a sorbent material for capturing halogen contaminants disposed downstream of the first water gas shift catalyst.

The invention departs from the normal practice in which chloride guard beds are not placed in the first shift vessel due to concerns that they would not be effective. The invention overcomes the problems of the prior art processes. In particular, the risk of condensation and resulting contamination of the second shift catalyst is avoided.

The synthesis gas in the present invention may be any synthesis gas comprising hydrogen and carbon oxides, for example one containing hydrogen, carbon monoxide and carbon dioxide formed by the catalytic steam reforming, autothermal reforming or secondary reforming of hydrocarbon feedstocks such as natural gas or naphtha, or by the gasification of carbonaceous or biomass feedstocks such as coal or biomass. Nitrogen may be present in the synthesis gas mixture. The carbon monoxide content of the synthesis gas fed to the first water-gas shift catalyst is suitably 5 to 30 mole % on a dry gas basis but more reactive synthesis gases having carbon monoxide contents up to about 70 mole % on a dry-gas basis, may be used. By "dry gas basis" we mean the composition of the gas mixture disregarding the steam content.

The synthesis gas is preferably provided by steam reforming a hydrocarbon stream comprising methane.

The synthesis gas may be cooled if necessary to the inlet temperature for the first water gas shift vessel. Any suitable heat exchanger may be used but typically cooling may be performed using a waste heat boiler, optionally followed by one or more heat exchangers that may be used to heat water or process gas streams.

The synthesis gas requires sufficient steam to allow the water-gas shift reaction to proceed. Whereas synthesis gases derived from processes such as steam reforming may contain sufficient steam, reactive synthesis gases generally are deficient in steam and steam must be added. Where steam addition is required, the steam may be added by direct injection or by another means such as a saturator or steam stripper. The amount of steam should desirably be controlled such that the total steam:synthesis gas volume ratio in the synthesis gas mixture fed to the first water-gas shift catalyst is in the range 0.3:1 to 4:1, preferably in the range 0.3:1 to 2.5:1.

The process is preferably operated at elevated pressure in the range 1-100 bar abs, more preferably 15-50 bar abs.

The synthesis gas mixture is passed at an inlet temperature in the range 300-450° C. over a first water-gas shift catalyst disposed in a first shift vessel to form a first shifted gas mixture. The first water gas shift catalyst may therefore be a high temperature shift catalyst. For high temperature shift catalysts, the inlet temperature is preferably 300-380° C. and more preferably 310-350° C. so that the performance of the catalyst over an extended period is maximised. The shift process in the first shift vessel is preferably operated adiabatically without cooling of the catalyst bed, although if desired some cooling may be applied for example by passing cooling water under pressure through tubes disposed in the catalyst bed. The exit temperature from the first shift vessel is preferably 500° C., more preferably 475° C. to maximise the life and performance of the catalyst.

The first shifted gas mixture may be cooled if necessary to the inlet temperature of the second shift vessel. Cooling may be by means of any suitable heat exchanger. For example, cooling may be applied by raising steam or heating water or by interchange with a feed gas to the shift process or another gas stream, such as a hydrocarbon feed stream or a product gas stream from the shift process or a downstream process.

The first shifted gas mixture is passed at an inlet temperature in the range 170-300° C. over a second water gas shift catalyst disposed in a second shift vessel to form a second shifted gas mixture. The first water-gas shift catalyst and the second water-gas shift catalyst are different. In the present invention, the second water-gas shift catalyst comprises copper, which in use is in a reduced state.

The second water-gas shift catalyst may be a copper-containing low-temperature shift catalyst.

The second water-gas shift catalyst may be operated adiabatically in a low temperature shift process or cooling may be applied in an isothermal shift process.

In a low-temperature shift process, a gas containing carbon monoxide (preferably 4% v/v on a dry basis) and steam (at a steam to total dry gas molar ratio typically in the range 0.1 to 1.5) is fed at typically an inlet temperature in the range 170-300° C., preferably 170-250° C., most preferably 170-200° C. to the shift vessel and passed over the copper-containing catalyst in an adiabatic fixed bed having an outlet temperature typically in the range 200 to 360° C. at a pressure preferably in the range 15-50 bar abs. The outlet carbon monoxide content in the second shifted gas stream is typically in the range 0.1 to 1.0%, especially under 0.5% v/v on a dry basis.

In so-called isothermal shift, a copper-containing catalyst is used in contact with heat exchange surfaces. The coolant conveniently is water under such a pressure such that partial, or complete, boiling takes place. A suitable pressure is 15 to 50 bar abs and the resulting steam can be used, for example, to drive a turbine or to provide process steam for shift, or for an upstream stage in which the shift feed gas is generated. The water can be in tubes surrounded by catalyst or vice versa. The inlet temperature for the water-gas shift catalyst may be in the range 200-300° C. and the exit temperature from the isothermal shift catalyst may be higher or lower than the inlet temperature as desired.

Any suitable water-gas shift catalysts that are suitably active at the inlet temperatures of the first and second water-gas shift vessels may be used.

The first water gas shift catalyst in the first shift vessel may be a high-temperature shift catalyst comprising one or more iron oxides stabilised with chromia and/or alumina and which may optionally contain zinc oxide and one or more copper compounds. Conventional chromia-promoted magnetite catalysts may be used. Iron oxide/chromia shift catalysts are conventionally made by precipitation of iron and chromium compounds (that decompose to the oxides upon heating) from a solution of iron and chromium salts by the addition of a suitable alkaline reactant, e.g. sodium hydroxide or carbonate. The resulting precipitate is then washed, dried, and calcined and tableted to form catalyst precursor pellets. The precursor preferably has an iron oxide content (expressed as $Fe_2O_3$) of 60 to 95% by weight. Preferably the iron to chromium atomic ratio in the precursor is in the range 6 to 20, particularly 8 to 12. The precursor may contain oxides of other metals, e.g. aluminium, manganese, or, especially, copper. Particularly preferred precursors have an iron to copper atomic ratio of 10:1 to 100:1. Prior to use for the shift reaction, the pellets are subjected to reduction conditions wherein the iron oxide is reduced to magnetite ($Fe_3O_4$) and any chromium trioxide present reduced to the sesquioxide, chromia ($Cr_2O_3$). This reduction is often carried out in the reactor wherein the shift reaction is to be effected. The activity of the catalyst may be significantly increased by incorporating into the catalyst precursor particles of aspect ratio of at least 2 and a maximum dimension of at least 5000 Å (500 nm), and preferably less than 15000 Å (1500 nm) into the catalyst precursor pellets. Preferably the chromia-promoted magnetite catalyst comprises acicular iron oxide particles. Such catalysts compositions are described in U.S. Pat. No. 5,656,566. Alternatively, it may be desirable to at least partially replace the chromia in the iron-based first water-gas shift catalyst with alumina or another stabilising oxide. Zinc oxide and copper may desirably also be present. Such catalysts are described for example in EP2237882.

Alternatively the first water-gas shift catalyst in the first shift vessel may comprise a metal-doped zinc oxide/alumina composition. For example, a suitable catalyst contains oxides of zinc and aluminium together with one or more promoters selected from Na, K, Rb, Cs, Cu, Ti, Zr, rare earth elements and mixtures thereof. Such catalysts are described for example in EP2924002.

The water gas shift catalyst in the second shift vessel may be any copper-based water-gas shift catalyst, but is preferably a catalyst comprising copper and zinc oxide. When the shift catalyst contains copper and zinc oxide, its proportions need not be changed from those which have been previously proposed or used, for example containing up to about 70% of copper by metal atoms of the total copper and zinc, especially 10-50% copper. Usually copper is in excess of zinc, especially up to a ratio of about 6:1 by atoms, and commonly about 1.5 to 2.5. Suitable shift catalysts and low temperature processes using them are described in UK Patent 1131631. Preferred second water-gas shift catalysts comprise copper, zinc oxide and alumina. Preparation methods for such catalysts are described, for example, in EP2049249, EP2599541, EP1487578, EP2240273 and EP2442904. As with the iron-containing high temperature shift catalysts, the copper-based water gas shift catalyst is typically provided in oxidic form and prior to use the copper oxide is reduced using a reducing gas to copper metal. This reduction is often carried out in the reactor wherein the shift reaction is to be effected.

Preferably the first water-gas shift catalyst in the first shift vessel is a high temperature shift catalyst, more preferably an iron-containing high temperature shift catalyst. Suitable high-temperature water gas shift catalysts include Katalco™ 71-5 and Katalco™ 71-6 available from Johnson Matthey PLC.

Preferably the second water-gas shift catalyst in the second shift vessel is a copper-containing low-temperature shift catalyst. Suitable copper-containing low-temperature water gas shift catalysts include Katalco™ 83-3 and Katalco™ 83-3X available from Johnson Matthey PLC.

Preferably, the water gas shift process is performed adiabatically in the first and second shift vessels.

In the present invention the first shift vessel contains a sorbent material for capturing halogen contaminants disposed downstream of the first water gas shift catalyst. By the term "sorbent" we include adsorbent and absorbent.

The sorbent material may be as described in the aforesaid U.S. Pat. No. 3,922,337. Thus the sorbent material may be any solid material which is more basic than zinc oxide. The solid material more basic than zinc oxide conveniently can be a basic compound of any element of Group IA or Group IIA of the Periodic Table (other than beryllium) or of any other element, such as manganese, having a compound which is basic enough. Preferably the compound should be an oxide, hydroxide or a carbonate, so as not to introduce interfering by-products into the reaction system. Since the quantity of halogen present and the quantity needed to poison the catalyst are extremely small it is often sufficient to use an alkali metal or alkaline earth metal compound or adsorption complex of an inorganic polymer such as a clay, or even an ion exchange resin. Which basic compound is used depends on how the solid basic material is brought into contact with the gas containing carbon monoxide and steam. The basic material is very conveniently used as a composition in which it is supported on a carrier material. The carrier material preferably has a moderate specific surface (that is, 5-200 $m^2/g$). Thus, the sorbent material preferably comprises at least one of sodium oxide, sodium carbonate, potassium oxide or potassium carbonate supported on a carrier material, such as an alumina, silica, titania, zirconia, ceria, magnesia or zinc oxide, or a mixture thereof, or a refractory cement such as a calcium aluminate or a magnesium aluminate. The alkali concentration is preferably in the range 0.1 to 10% by weight, more preferably 0.5 to 5% by weight, calculated as sodium oxide or potassium oxide.

A preferred sorbent material is an alkalised refractory cement material, such as a sodium oxide-containing or potassium oxide-containing calcium aluminate. Alternatively, a sodium oxide-containing or potassium oxide-containing alumina, such as alpha-alumina, may be used. Potassium-containing sorbent materials are preferred. The amount of potassium, expressed as $K_2O$, is suitably 0.5 to 5% wt.

Without wishing to be bound by theory it is believed that the alkali reacts with the chloride contaminants to form the alkali metal chloride. This has been found surprisingly to be effective at the exit conditions from the bed of first water-gas shift catalyst.

The sorbent material should be effective for capturing halogen, in particular the chloride contaminants present in first shifted gas mixture, such as HCl. Preferably the chloride content of the first shifted gas mixture is reduced from an amount in the range 1-100 ppbv to an amount ≤0.5 ppbv.

The presence of the sorbent material in the first shift vessel downstream of the first shift catalyst reduces the halogen contaminants in the feed to the copper-containing second water-gas shift catalyst thereby extending its life. The location of the sorbent material in the hotter first shift vessel reduces the risk of condensation on the sorbent material and therefore reduces the risk of contamination of the second water-gas shift catalyst by soluble components therein.

Typically, the first shift vessel comprises a cylindrical shell with domed ends. The vessel is usually installed with the axis of the cylinder aligned vertically. An inlet is placed at or near the top of the vessel and an outlet at or near the bottom of the vessel, such that the flow through the vessel is downwards. In one arrangement, a perforate gas collector is disposed around the outlet to prevent leakage of the catalyst or bed support material through the outlet. The gas collector may be formed from a perforate plate, mesh or screen. Such gas collectors may be cylindrical or frusto-conical in shape. In another arrangement, the catalyst bed is supported on a perforate grid or screen that extends across the inside of the vessel creating a void in the domed end above the outlet.

In the present invention, the sorbent material is preferably disposed immediately downstream of the first water gas shift catalyst. A perforate mesh or screen may be provided to separate the first water-gas shift catalyst from the sorbent material to simplify unloading. The support material may be particulate or may comprise a sorbent material coated onto the surface of a ceramic or metal structure, such as a honeycomb. Preferably the sorbent material is particulate to simplify loading and unloading. Thus the sorbent material may be a granulated, pelleted or extruded material. Preferably, the sorbent material is a pelleted or extruded material.

In a preferred arrangement, with flow of the first shifted gas stream downwards though the first shift vessel, the first shift vessel preferably contains a fixed bed of a particulate shift catalyst physically supported on, i.e. on top of, a bed of sorbent material. The sorbent material may therefore be used as a bed support for the first water-gas shift catalyst. The sorbent material when used as a bed support may be used alone or may be used in combination with one or more conventional particulate ceramic bed support materials.

In one embodiment, first shift vessel comprises a bed of the first water-gas shift catalyst supported on a bed of sorbent material disposed around a gas collector, which may be within a domed end of the vessel.

In another embodiment, the first shift vessel comprises a bed of the first water-gas-shift catalyst supported on a bed of sorbent material, which in turn is supported on a mesh, grid, or screen extending across the inside of the first shift vessel.

Preferably the bed of sorbent material is used in combination with an inert ceramic bed support material. The inert ceramic bed support material may be in the form of spheres, rings or irregular lumps. The ceramic bed support material is typically a low surface area alpha alumina material and is not an effective sorbent for halogen contaminants in the first shifted gas mixture. The inert ceramic bed support materials may include DYPOR 607, KATALCO™ 92-1 and KATALCO™ 90-1 available in different sizes from Johnson Matthey PLC.

The first water-gas shift catalyst and the second water-gas shift catalyst are preferably particulate materials, such as cylindrical shapes, having a diameter or width in the range 3-10 mm and an aspect ratio (i.e. length/diameter or width) in the range 0.5-2, preferably 0.5-1.

In a preferred arrangement, the pressure drop through the sorbent material is lower than the pressure drop through the first water gas shift catalyst. The pressure drop may be altered by using particles of different size, structured catalysts, or by using designs that provide a larger voidage. Accordingly, a lower pressure drop may be achieved by using larger particle sizes and/or by providing the sorbent material in the form of a shaped particle comprising two of more flutes or channels and/or one or more through-holes. Thus the sorbent material may have a diameter or width in the range 5-200 mm and be in the form of spheres, rings, cylinders or irregular lumps or honeycomb-like structures. Preferably the sorbent material is provided as a particulate or monolithic material. Particulate sorbent materials desirably have diameters or widths in the range 10-50 mm an aspect ratio in the range 0.5-2.

In a preferred arrangement, the first shift vessel contains a particulate first water-gas shift catalyst and a particulate sorbent material having a larger particle size than the first water-gas shift catalyst and having two or more flutes or channels and/or one or more through-holes.

Preferably the particulate sorbent material comprises 3-12 flutes and 1-10 through holes as this offers stronger sorbent materials that are less likely to suffer from breakage during use. Especially preferred sorbent materials are in the form of a cylindrical 4-hole, 4-fluted quadralobe or a cylindrical 5-hole, 5-fluted pentalobe.

It has been found useful to provide the sorbent material in two or more different forms to enhance the flow of the first shifted gas through the sorbent material to the outlet of the first shift vessel. Thus the sorbent material may be provided in two or more zones, preferably 2, 3 or 4 zones around the outlet, each zone having a different particle size and/or voidage. A first zone, adjacent the first water-gas shift catalyst, may have the same particle size and/or voidage or a larger particle size and/or voidage than the first water-gas shift catalyst. A second zone downstream of and adjacent the first zone may have a larger particle size and/or voidage than the first zone. If a third zone is provided downstream of and adjacent the second zone, this may have a larger particle size and/or voidage than the second zone. Similarly, if a fourth or further zone is provided downstream of and adjacent the third zone, this may have a larger particle size and/or voidage than the third zone. The zones may be provided as layers within the first shift vessel. These layers may be supported on a grid, mesh or screen or be disposed around a gas collector.

In one arrangement the sorbent material is provided as fixed bed of particles comprising one or more horizontal layers above one or more annular layers disposed around a gas collector situated adjacent an outlet from the first shift vessel. The one or more annular layers may comprise either one or more inert ceramic bed support materials or a sorbent material. The annular layer may be divided into an inner annular layer adjacent the gas collector and an outer annular layer extending to the vessel wall. The inner annular layer may comprise either an inert ceramic bed support material or a sorbent material. In one embodiment, the inner annular layer is an empty space formed by perforate mesh or screen around the gas collector. The outer layer is preferably sorbent material. The particle size and/or voidage of the sorbent material and the inert ceramic bed support materials may be varied to enhance the flow of the first shifted gas to the gas collector and outlet from the first shift vessel.

The first shifted gas mixture, which is depleted in halogen contaminants by the sorbent material may be recovered from the first shift vessel and passed, with appropriate temperature adjustment if necessary to the second shift vessel. Temperature adjustment by means of cooling with water or suitable gas is preferred. In the first and second shift vessels, carbon monoxide in the gas mixture is converted over the water-gas shift catalysts to carbon dioxide with the formation of hydrogen.

The second shifted gas stream, which is enriched in hydrogen and depleted in carbon monoxide, may be subjected to one or more further shift stages, but this is usually unnecessary. Preferably the second shifted gas stream is used in conventional downstream processes. Hence, the shifted gas, without further shifting, may be cooled to a temperature below the dew point so that the steam condenses. The de-watered shifted gas mixture may be fed to methanol, dimethyl ether, Fischer-Tropsch wax, olefin and other chemical syntheses processes or may be subjected to a stage of $CO_2$-removal to generate hydrogen for ammonia synthesis or the generation of electrical power as part of an IGCC process.

The Invention will now be further described by reference to the drawings in which.

Figure 1:
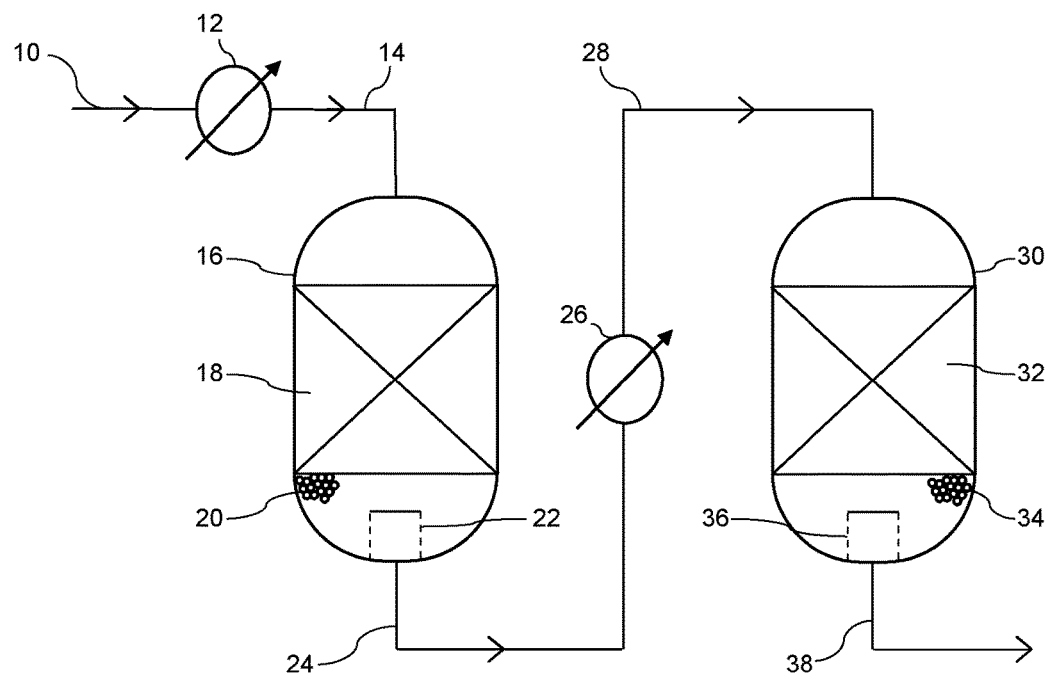
FIG. 1 is a depiction of one process according to the invention.

In FIG. 1, a synthesis gas mixture 10 having a CO content in the range 5-30 mole % on a dry gas basis and containing steam at a steam:synthesis gas volume ratio in the range 1:1 to 2.5:1, if fed to a heat exchanger 12 where the temperature is adjusted to a temperature between 300 and 450° C. and passed via line 14 to an inlet at the top of a first shift vessel 16 containing a first water gas shift catalyst 18. The first water-gas shift catalyst 18 is in the form of a fixed bed of a particulate high temperature shift catalyst. The particulate high temperature shift catalyst is suitably an iron-containing high temperature shift catalyst in the form of cylindrical pellets, such as Katalco™ 71-5. The water-gas shift reaction occurs as the synthesis gas mixture is passed downwards through the bed 18 to convert a portion of the CO to $CO_2$ and form hydrogen. The first shifted synthesis gas mixture passes from the bed 18 to a fixed bed of particulate sorbent material 20 disposed downstream of the first water-gas shift catalyst 18 and within the first shift vessel 16. The sorbent material is suitably an alkalised alumina in the form of 4-hole quadralobe pellets. The sorbent material is effective at capturing the halogen contaminants and reducing the chloride content of the first shifted gas mixture. In this embodiment, the sorbent material 20 supports the bed of first water-gas shift catalyst 18 with the vessel 16. The sorbent material 20 may be divided into two or more zones (not shown), each having a different voidage and different pressure drop, that enhance the flow of the shifted gas through the bed 20. The sorbent material 20 is prevented from leaking from the vessel 16 by means of a gas collector 22 disposed about the outlet of the vessel. The gas collector 22 comprises a perforate member, such as a perforate screen or mesh sized to prevent the particles of sorbent material from passing through. The halogen-depleted first shifted gas mixture is recovered from the outlet of the first shift vessel 16 and fed via line 24 to a heat exchanger 26 in which the temperature of the first shifted gas mixture is adjusted to 170-300° C. The temperature-adjusted, halogen depleted first shifted gas mixture is passed from the heat exchanger 26 via line 28 to an inlet at the top of a second shift vessel 30 containing a second water gas shift catalyst 32. The second water-gas shift catalyst 32 is in the form of a fixed bed of a particulate copper containing catalyst. The particulate copper-containing catalyst is suitably a copper-containing low temperature shift catalyst in the form of cylindrical pellets, such as Katalco™ 83-3X. The water-gas shift reaction occurs as the first shifted gas mixture is passed downwards through the bed 32 to convert at least a portion of the remaining CO to $CO_2$ and form hydrogen. The second shifted gas mixture passes from the bed 32 though a supporting bed of inert ceramic balls, pellets or lumps 34 disposed beneath the second water-gas shift catalyst 32 within the second shift vessel 30. The ceramic support material may suitably be high purity alumina spheres such as Katalco™ 92-1, available from Johnson Matthey PLC. The ceramic support material may be divided into two or more zones (not shown), each having a different particle size and/or voidage, that enhance the flow of the shifted gas through the bed support material 34. The ceramic support material 34 is prevented from leaking from the vessel 30 by means of a gas collector 36 disposed about the outlet of the vessel. The gas collector 36 may be the same type as that used in the first shift vessel. The second shifted gas 38, enriched in hydrogen and further depleted in carbon monoxide, is recovered from an outlet of the second shift vessel 30 and used in downstream processes.

Figure 2:
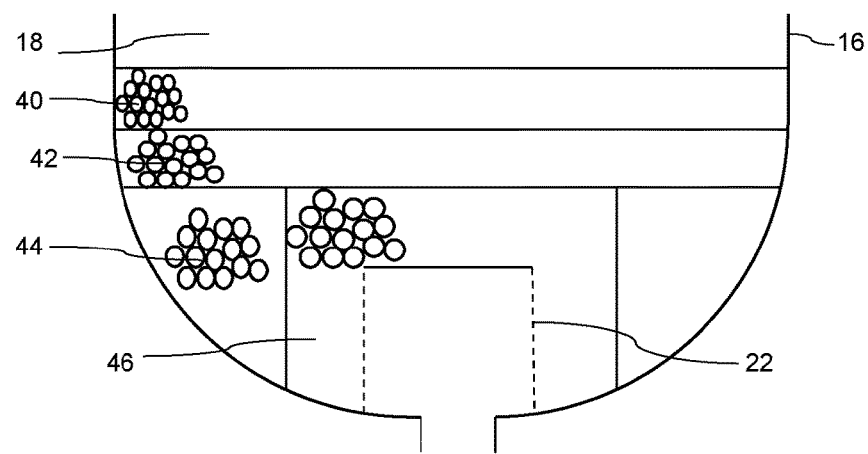
FIG. 2 is a depiction of one arrangement of sorbent materials in a first shift vessel.

In FIG. 2 the bed of sorbent material 20 under the bed of first water-gas shift catalyst 18 at the bottom of the first shift vessel 16 is divided into four zones 40, 42, 44 and 46. The first and second zones 40, 42 comprise horizontal cylindrical layers of particulate sorbent materials. The first zone 40 is disposed immediately beneath the first water gas shift catalyst 18. The second zone 42 is disposed immediately beneath the first zone 40. The third and fourth zones 44, 46 are disposed as annular beds beneath the second zone 42. The third zone 44 is disposed as an outer annular bed in contact with the vessel wall and the fourth zone 46 as an inner annular bed in contact with the gas collector 22. The first zone may be separated from the first water-gas shift catalyst 18 by a perforate mesh or screen (not shown). If desired, the first and second zones 40, 42 may be separated from each other by a perforate mesh or screen, but with a suitable grading of the particle size, this is not necessary. The particle size of the sorbent materials in the first and second zones may be the same, but in a preferred embodiment the particle size in the second zone 42 is larger than that of the particles in the first zone 40. The third zone 44 is separated from the fourth zone 46 by a perforate mesh or screen (not shown).

Optionally, the second and third zones may also be separated by a perforate mesh or screen. The third zone 44 is filled with a particulate sorbent material or particles of an inert ceramic bed support material. The particles of sorbent material or inert ceramic bed support material may be the same size as the sorbent material in the second zone 42 but in a preferred embodiment the particle size in the third zone 44 is larger than that of the particles in the second zone 42. The fourth zone 46 may be filled with a particulate sorbent material or particles of an inert ceramic bed support material. The particles of sorbent material or inert ceramic bed support material may be the same size as the sorbent material in the third zone 44 but in a preferred embodiment the particle size in the fourth zone 46 are larger than that of the particles in the third zone 44. In one embodiment, the fourth zone 46 is empty such that there is an empty space around the gas collector 22 defined by the perforate mesh or screen, which may be suitably reinforced. This arrangement offers a reduced overall pressure drop though the bed of sorbent material.

In use the first shifted gas mixture emerging from the first water gas shift catalyst 18 passes to the first zone 40 and then the second zone 42. The sorbent material in the first and second zones removes at least a portion of the halogen contaminants from the shifted gas mixture at the exit temperature of the first water-gas shift catalyst. The shifted gas mixture then passes through the third and fourth zones 44, 46 to the gas collector 22 and then to the outlet of the vessel 16.

The invention is further illustrated by reference to the following Examples.

EXAMPLE 1

A laboratory fixed bed reactor was charged with 50 ml of a potassium-doped alumina sorbent material containing 2% wt $K_2O$. A gas mixture mimicking a first shifted gas mixture and comprising (on a dry gas basis) 55% vol hydrogen, 25% vol nitrogen, 4% vol carbon monoxide, and 16% vol carbon monoxide and steam was passed through the sorbent material for 25 days at a flowrate of 1300 l/hr, a reactor temperature of 430° C., a pressure of 30 barg and a steam to dry gas volume ratio of 0.5:1. The HCl concentration in the gas feed was 11.5 ppbv. No chloride was detected in the exit gas, using a Kitigawa gas test tube, throughout the test period. After the test was completed, the sorbent material was recovered and analysed for Cl content. The inlet portion contained 330 ppm Cl and the exit portion 130 ppm Cl. The condensed water was also collected and analysed for potassium content by ICP IES. No potassium in the condensate was observed. The results showed the effectiveness and stability of the sorbent at capturing the HCl under the exit conditions of a first shift vessel.

EXAMPLE 2

Various arrangements according to FIG. 2 were modelled to assess the overall pressure drop (dP) through the first shift vessel containing different particulate ceramic support and sorbent materials. The relevant support and sorbent data is shown in the following tables:

TABLE 1

| | Ceramic support data | | | | | | | |
|---|---|---|---|---|---|---|---|---|
| | DYPOR 607 | | | KATALCO 92-1 | | KATALCO 90-1 | | |
| | | | | | | 90-1E | 90-1H | 90-1J |
| Code | FB | EC | FD | 92-1G | 92-1K | (Small) | (Medium) | (Large) |
| Diameter/Width [mm] | 16.0 | 40.0 | 85.0 | 25.0 | 75.0 | 25-50 | 50-100 | 100-200 |
| Length [mm] | 16.0 | 40.0 | 80.0 | — | — | — | — | — |
| No of through-holes | 1 | 1 | 1 | — | — | — | — | — |
| hole Diameter [mm] | 7.0 | 14.0 | 35.0 | — | — | — | — | — |

TABLE 2

| | Sorbent material data | |
|---|---|---|
| | Sorbent material | |
| Code | Sorbent 1 | Sorbent 2 |
| Diameter [mm] | 13.0 | 16.0 |
| Length [mm] | 17.0 | 20.0 |
| no. of holes | 4 | 4 |
| hole Diameter [mm] | 3.5 | 4.4 |

DYPOR 607 is in the form of cylindrical rings, KATALCO 92-1 is in the form of spheres and Katalco 90-1 in the form of irregular lumps. Since the KATALCO 90-1 support material is made of irregular lumps, their size is given as a range (90-1E=25-50 mm, 90-1H=50-100 mm, 90-1J=100-200 mm). The sorbent materials, Sorbent 1 and Sorbent 2, were in the form of 4-holed, 4-fluted cylinders.

Shift Vessel (I)

A computer model of a first shift vessel (I) was based on high temperature shift vessel containing a particulate iron-based high temperature shift catalyst (Katalco 71-5/Katalco 71-6). The conditions were as follows;

| | |
|---|---|
| Flow | 224.6 te/hr |
| Density | 8.993 kg/m$^3$ |
| Viscosity | $2.28 \times 10^{-2}$ cP |
| End ratio | 4.426 |
| h1 depth of zone 1 (40) | 76.2 mm |
| h2 depth of zone 2 (42) | 25.4 mm |
| h3 depth of zone 3 (44) to top of collector (22) | 100.0 mm |
| h4 height of collector (22) | 528.6 mm |
| d1 diameter of collector (22) | 1028.6 mm |
| d2 diameter of zone 4 (46) | 1428.6 mm |
| d3 diameter of vessel (16) | 4080.0 mm |

TABLE 3

Pressure drop results of First Shift Vessel (I)

|  | Comparative Ceramic Support in Zones 1-4 | Example 2(a) Sorbent in zones 1 & 2 and ceramic support in zones 3 & 4 | Example 2(b) Sorbent in zones 1-3 and ceramic support in zone 4 | Example 2(c) Sorbent in zones 1-3 and ceramic support in zone 4 | Example 2(d) Sorbent in zones 1-4 |
|---|---|---|---|---|---|
| Zone 1 | 90-1E | Sorbent 1 | Sorbent 1 | Sorbent 1 | Sorbent 1 |
| Zone 2 | 90-1E | Sorbent 1 | Sorbent 1 | Sorbent 1 | Sorbent 1 |
| Zone 3 | 90-1H | 90-1H | Sorbent 1 | Sorbent 1 | Sorbent 1 |
| Zone 4 | 90-1J | 90-1J | 90-1J | FD | Sorbent 1 |
| dP_support [bar] | 0.027 | 0.029 | 0.050 | 0.037 | 0.167 |
| dP_bed [bar] | 0.181 | 0.181 | 0.181 | 0.181 | 0.181 |
| dP_tot [bar] | 0.208 | 0.210 | 0.231 | 0.218 | 0.348 |
| dP_support [%] | 13% | 14% | 22% | 17% | 48% |

In the comparative configuration, the support material has a pressured drop of 0.027 bar, contributing 13% of the total pressured drop (catalyst bed+support).

If zones 1 and 2 are replaced by the chloride guard Sorbent 1 (Examples 2(a)), the pressure drop increases by a negligible amount (0.027 to 0.029 bar), and its contribution to the total pressure drop goes from 13% to 14%.

The amount of material that can be placed in zones 1 and 2 is limited; therefore Example 2(b) considers filling zone 3 as well with the chloride guard Sorbent 1. In this case the support pressure drop increases to 0.050 bar (22% of total), which is still deemed acceptable.

When the material currently inside zone 4 is replaced by DYPOR 607 FD (Example 2(c)), then the pressure drop is improved at 0.37 bar (17% of total).

Example 2(d) illustrates what would happen if the bottom of the first shift vessel was filled with the chloride guard

| Flow | 213.7 te/hr |
|---|---|
| Density | 8.731 kg/m$^3$ |
| Viscosity | 2.25 × 10$^{-2}$ cP |
| End ratio | 3.52 |
| h1 depth of zone 1 (40) | 214.9 mm |
| h2 depth of zone 2 (42) | 190.8 mm |
| h3 depth of zone 3 (44) to top of collector (22) | 251.5 mm |
| h4 height of collector (22) | 215.9 mm |
| d1 diameter of collector (22) | 939.8 mm |
| d2 diameter of zone 4 (46) | 1778.0 mm |
| d3 diameter of vessel (16) | 3886.2 mm |

TABLE 4

Pressure drop results of First Shift Vessel (II)

|  | Comparative Ceramic Support in Zones 1-4 | Comparative Ceramic Support in Zones 1-4 | Example (2e) Sorbent in Zones 1 & 2; ceramic support in zones 3 & 4 | Example 2(f) Sorbent in Zones 1 & 2; ceramic support in zones 3 & 4 | Example 2(g) Sorbent in zones 1-4 | Example 2(h) Sorbent in zones 1-3; ceramic support in zone 4 |
|---|---|---|---|---|---|---|
| Zone 1 | FB | 92-1G | Sorbent 1 | Sorbent 1 | Sorbent 1 | Sorbent 1 |
| Zone 2 | EC | 92-1G | Sorbent 2 | Sorbent 2 | Sorbent 1 | Sorbent 1 |
| Zone 3 | FD | 92-1K | EC | FD | Sorbent 1 | Sorbent 1 |
| Zone 4 | FD | 92-1K | EC | FD | Sorbent 1 | FD |
| dP_support [bar] | 0.031 | 0.161 | 0.105 | 0.038 | 0.605 | 0.062 |
| dP_bed [bar] | 0.192 | 0.192 | 0.192 | 0.192 | 0.192 | 0.192 |
| dP_tot [bar] | 0.223 | 0.353 | 0.298 | 0.230 | 0.797 | 0.254 |
| dP_support [%] | 14% | 46% | 35% | 17% | 76% | 24% |

Sorbent 1. In this case the pressure drop in the support would be higher than the other examples.

This example demonstrates that zones 1 and 2 may readily be filled with the chloride guard, and in case these zones are not large enough, a large additional volume of zone 3 can be filled with the chloride guard in the curved vessel bottom. In this case it is preferred that the zone 4 material contains a ceramic support material of large particle size.

Shift Vessel (II)

A model of another first shift vessel (II) was based on high temperature shift vessel containing a particulate iron based high temperature shift catalyst (Katalco 71-5/Katalco 71-6). The conditions were as follows;

The comparative examples feature just support systems, and it can be seen that the graded support system gives a lower pressure drop.

Example 2(e) replaces zones 1 and 2 with the Sorbent 1 and Sorbent 2 chloride guards, and it uses DYPOR 607 EC in the bottom of the converter. The pressure drop has clearly increased from the first comparative examples but it is still lower than the solution with the second comparative example.

If a mesh is placed between zones 2 and 3 (Example 2f), allowing the bottom of the vessel to be filled with larger material, then the pressure drop goes back to a value just slightly higher than the first comparative example.

Example 2(g), where Sorbent 1 is placed in all 4 zones, produces a higher pressure drop than the comparative examples.

If a mesh screen is fitted around the gas collector (22) to define a zone 4 (46) and zone 4 is filled with very large material (Example 2(h)), then the pressure drop goes back to acceptable levels, the rest of the vessel bottom still being completely filled with chloride guard.

The invention claimed is:

1. A process for increasing the hydrogen content of a synthesis gas mixture comprising hydrogen, carbon oxides and steam, the process comprising:
   (i) passing the synthesis gas mixture through a first shift vessel having an inlet temperature in the range of 300-450° C., the first vessel comprising a first high temperature water-gas shift catalyst and a sorbent material for capturing halogen contaminants disposed downstream of the first high temperature water gas shift catalyst to form a first shifted gas mixture, and then
   (ii) passing the first shifted gas mixture at an inlet temperature in the range of 170-300° C. over a second low temperature water-gas shift catalyst comprising copper disposed in a second shift vessel to form a second shifted gas mixture,
   wherein the second shifted gas mixture has a higher hydrogen content than does the synthesis gas mixture.

2. The process according to claim 1, wherein the sorbent material comprises a solid material which is more basic than zinc oxide.

3. The process according to claim 2, wherein the sorbent material comprises a basic compound of any element of Group IA or Group IIA of the Periodic Table, other than beryllium.

4. The process according to claim 2, wherein the sorbent material comprises a solid material which is more basic than zinc oxide supported on a carrier material.

5. The process according to claim 1, wherein the sorbent material comprises at least one of sodium oxide, sodium carbonate, potassium oxide or potassium carbonate supported on a carrier material that is alumina, silica, titania, zirconia, ceria, magnesia or zinc oxide, or a mixture thereof, or a refractory cement.

6. The process according to claim 5, wherein the alkali concentration in the sorbent material is in the range of 0.1 to 10.0% by weight calculated as sodium oxide or potassium oxide.

7. The process according to claim 5, wherein the alkali concentration in the sorbent material is in the range of 0.5 to 5% by weight calculated as sodium oxide or potassium oxide.

8. The process according to claim 1, wherein the sorbent material is present in two or more different forms to enhance the flow of the first shifted gas through the sorbent material.

9. The process according to claim 8, wherein the sorbent material is provided in two or more zones.

10. The process according to claim 9, wherein the zones are provided as layers within the first shift vessel.

11. The process according to claim 8, wherein the sorbent material is provided as fixed bed of particles comprising one or more horizontal layers above one or more annular layers disposed around a gas collector situated adjacent an outlet from the vessel.

12. The process according to claim 11, wherein the one or more annular layers comprise either an inert ceramic bed support material, a sorbent material, or an inert ceramic bed support material and a sorbent material.

13. The process according to claim 8, wherein the sorbent material is provided in 2, 3 or 4 zones.

14. The process according to claim 1, wherein the high-temperature shift catalyst comprises an iron-containing catalyst.

15. The process according to claim 1, wherein the water gas shift process is performed adiabatically in the each of the first and second shift vessels.

* * * * *